United States Patent
Ellis et al.

(10) Patent No.: US 7,273,320 B2
(45) Date of Patent: Sep. 25, 2007

(54) METHOD AND APPARATUS FOR CLEANING PARTICULATE MATTER FROM AN OPTIC-CONNECTOR SURFACE

(75) Inventors: Francis Clay Ellis, Livermore, CA (US); Sam Novinsky, San Jose, CA (US)

(73) Assignee: Pluris, Inc., Cupertino, CA (US)

( * ) Notice: Subject to any disclaimer, the term of this patent is extended or adjusted under 35 U.S.C. 154(b) by 21 days.

(21) Appl. No.: 10/131,702

(22) Filed: Apr. 23, 2002

(65) Prior Publication Data

US 2003/0026549 A1   Feb. 6, 2003

Related U.S. Application Data

(63) Continuation-in-part of application No. 09/920,556, filed on Jul. 31, 2001, now Pat. No. 6,533,463.

(51) Int. Cl.
*G02B 6/40* (2006.01)
*G02B 6/36* (2006.01)
*G02B 6/00* (2006.01)

(52) U.S. Cl. .............. 385/53; 385/54; 385/85; 385/134; 385/78; 385/88; 385/89

(58) Field of Classification Search ............ 385/53, 385/134, 139, 95, 96, 97, 98
See application file for complete search history.

(56) References Cited

U.S. PATENT DOCUMENTS

| | | | | |
|---|---|---|---|---|
| 6,006,768 A | * | 12/1999 | Cox | 134/200 |
| 6,047,716 A | * | 4/2000 | Shimoji et al. | 134/166 C |
| 6,125,227 A | * | 9/2000 | Cox | 385/134 |
| 6,374,030 B2 | * | 4/2002 | Krow et al. | 385/134 |
| 6,816,662 B2 | * | 11/2004 | Doss et al. | 385/134 |
| 6,839,935 B2 | * | 1/2005 | Kiani et al. | 15/345 |
| 6,975,803 B2 | * | 12/2005 | Koide et al. | 385/134 |
| 2005/0013577 A1 | * | 1/2005 | Koide et al. | 385/134 |

OTHER PUBLICATIONS

U.S. Appl. No. 09/920,556, Peter John Doyle, Priority Claim.

* cited by examiner

*Primary Examiner*—Nimeshkumar D. Patel
*Assistant Examiner*—Peter Macchiarolo
(74) *Attorney, Agent, or Firm*—Donald R. Boys; Central Coast Patent Agency, Inc.

(57) ABSTRACT

A cleaning tool for cleaning particulate matter from contact surfaces of fiber-optics ferrules of an electronics assembly has one or more first connector halves for engaging one or more second connector halves hosting the ferrules to be cleaned, and one or more cleaning inserts provided within the one or more first connector halves, the cleaning inserts comprising adherent surfaces for removing particulates from engaged surfaces. The tool is characterized in that the one or more cleaning inserts are sized to contact the contact surfaces of the fiber optics ferrules with the first connector half engaged in the second connector half.

4 Claims, 8 Drawing Sheets

METHOD AND APPARATUS FOR CLEANING PARTICULATE MATTER FROM AN OPTIC-CONNECTOR SURFACE

CROSS REFERENCE TO RELATED DOCUMENT

The present invention is a continuation-in-part (CIP) to a U.S. patent application Ser. No. 09/920,556 entitled "Adjustable and Modular Backplane Assembly for Providing a Fiber-Optics Communication Backplane" filed on Jul. 31, 2001; issued on Mar. 18, 2003 U.S. Pat. No. 6,533,463, the complete disclosure of which is included herein by reference.

FIELD OF THE INVENTION

The present invention is in the field of fiber-optics communication and pertains more particularly to a fiber-optics backplane assembly for a scalable router and apparatus for cleaning the optic-connector surfaces of the backplane assembly.

BACKGROUND OF THE INVENTION

In the general state of the art of electrical and electronic systems housed in cabinets (often termed chassis), there are typically inputs and outputs to the system, facilitated by connection of communication links of various sorts, over which signals are received and sent. There are also numerous situations wherein groups of components in a chassis have to be connected to and communicate with other groups of components internally. Data routers in packet networks, such as the well-known Internet, are a good example. In description in this specification a data router is used as a specific example of such a situation, and the present invention in several aspects is applicable to such routers.

Transmission of network data traffic is accomplished with the use of data routers as introduced above. A physical data routing machine typically consists of a processing unit or multiple units which are housed in a chassis and which communicate with each other and with other data routing machines.

In prior art, one method for achieving communication between processing units in a single chassis, such as in a data router, involves the use of an electrical backplane. When communication between multiple chassis is required, cables have been used to connect the electrical backplanes of the chassis. The electrical backplane is commonly implemented as a printed circuit board assembly, which provides electrical connectivity between processing units.

Noting that it may sometimes be desirable to communicate at backplane level between elements that are not closely physically associated, such as between elements that may be mounted in separate physical electronic cabinets, there is a potential problem with electrical backplanes. When an electrical signal is transmitted over relatively long distances, for example, deterioration of the signal may occur for any of several reasons. For example, longer signal paths necessarily present additional resistance. Also, longer paths present additional opportunity for interference. Therefore, in order to transmit clean signals in systems utilizing electrical backplanes, the elements in communication must be in relatively close physical proximity to one another, such as in the same cabinet.

Another drawback to electrical backplane boards is that they are relatively difficult to service. One reason is that the conductors for the electrical signals are typically patterned on the board, and individual conductors (signal paths) cannot be separately serviced. In many cases the backplane boards are also hardwired to other components. Because any change or repair is normally via a replacement of the entire backplane, the system containing the electrical backplane is generally out of service during any backplane service.

A modular and adjustable backplane assembly is known to the inventor, and is taught in the patent application referenced as a priority document in the Cross-Reference section above. The assembly provides a fiber-optics backplane interface to a plurality of router cards functioning as a data router. The modular assembly has a first portion housing a first array of connector halves for interfacing with a compatible array of connector halves mounted to specified router cards. The assembly also has a second portion having a second array of connector halves for interfacing with a compatible array of connector halves specific to another type of router card used in the same router. The mechanics of the assembly enable a moveable backplane attachment with respect to the first and second portions of the assembly such that they may be positionally adjusted during mounting, and wherein external data paths are provided from individual ones of the connectors to individual others of the connectors by fiber-optic conductors. The backplane assembly is illustrated in FIGS. 1 and 2 herein, and the adjustment capability is illustrated in FIG. 2 of the co-pending application.

In the above-referenced backplane assembly, each connector housing comprises a male and female component (halves) that snap together. Referring to FIG. 1 of Ser. No. 09/920,556, only the backplane connector halves LC and FC connectors 103 and 102 respectively are illustrated. Each component contains at least 4 separate fiber optic contact inserts provided in the form of spring-loaded inserts, also termed ferrules by the inventor, that when inserted properly and with the connector housing snapped together, provide the actual fiber optic interface. Each springloaded insert or ferrule has a connector head, a snap-in body, and a spring bridging the former components to provide flexibility in alignment. The entire assembly fits over a fiber optic cable set and presents the fiber optics cable ends in a strategic array. Two opposing ferrules in proper position complete a fiber-optics channel. The connector heads of the backplane inserts contain the contact surface portions which must be kept clean to provide a good fiber optics connection. As is well known in the art, particulate matter collecting on the contact surfaces of a fiber optics ferrule can seriously degrade transmission performance.

In current art, the fabric cards and line cards (FC,LC) of the router connect to the backplane assembly through the router chassis utilizing the housing connector components to align and retain the multiple opposing inserts that actually form the transmission connections (See FIG. 3). Each router card has mounted thereon an array of one type (male or female) housing components. Currently on one type of card (FC) there are 5 such housing components retaining 4 each of the contact inserts. Therefore, there are 20 separate inserts or ferrules per card that interface with a same number of inserts or ferrules in the backplane assembly whose contact surfaces must be kept free of particulate matter.

Current cleaning practices require that a card first be removed from its shelf (unplugged) so that the associated backplane contact surfaces are then accessible for cleaning. Each component housing retaining the inserts on the backplane has a spring-loaded, hinged door that covers the contact surfaces of its housed inserts collectively and protects those surfaces from dust and other particulate matter when a card is not plugged in to the assembly. The door swings positively toward the inside of the housing and inserts when pushed on. When the housing components are snapped together, the door is in the open position.

A cleaning tool for cleaning particulates from a single connector surface is available to the inventor. This tool has a handle extension and a profile that allows the cleaning portion of the tool to extend through the small space in a card shelf left by a removed card. The tool must be inserted through the space and through the door of the component housing on the backplane in order to reach the contact surface to be cleaned. Because the component housings are vertically stacked (typically 5) on the backplane assembly, an adjustment mechanism with an extension is provided to elevate the cleaning tool to the proper height profile of each insert contact surface to be cleaned. Adjustments must be made each time one surface is cleaned.

What is clearly needed is a mechanism for cleaning optics contact surfaces on a backplane assembly that can clean all of the surface areas comprising a connection between a router card and a backplane assembly simultaneously or at least much more efficiently than cleaning one surface at a time between height adjustments. A mechanism such as this would greatly reduce downtime to a router connection due to cleaning.

SUMMARY OF THE INVENTION

In a preferred embodiment of the present invention a cleaning tool for cleaning particulate matter from contact surfaces of fiber-optics ferrules of an electronics assembly is provided, comprising one or more first connector halves for engaging one or more second connector halves hosting the ferrules to be cleaned, and one or more cleaning inserts provided within the one or more first connector halves, the cleaning inserts comprising adherent surfaces for removing particulates from engaged surfaces. The tool is characterized in that the one or more cleaning inserts are sized to contact the contact surfaces of the fiber optics ferrules with the first connector half engaged in the second connector half.

In some embodiments the cleaning insert comprises a base structure having one or more extending fingers for extending through the first connector half, and the fingers may be contiguous with the base, or may be removable.

In some embodiments the tool is in the form of a single first connector half, having a sufficient number of cleaning inserts to match the standard number of fiber optics ferrules in a connector. In some cases the inserts are fashioned to be removable from the first connector half and discarded after one or a few cleanings. The adherent surface can be provided in a number of ways, such as by a portion of double-back tape. In some cases one side of the tape is more adherent than the other side, the less adherent side for collecting the particulate matter. In one preferred embodiment there are at least 4 cleaning inserts.

In some cases the insert or inserts are used repeatedly for cleaning and the adherent portions are fashioned to be quickly removable to be discarded and replaced. Also in some cases the tool is fashioned as a dummy router card having a mounting surface mounting a plurality of the first connector halves, the dummy router card dedicated as a cleaning card. The dummy router card may be a fabric card and comprises at least 5 first connector halves, each retaining at least one cleaning insert, and wherein the total of cleaning surfaces is no less than 20.

In some embodiments there a plurality of first connector halves implemented in a single contiguous framework, each of the first connector halves comprising a plurality of cleaning inserts, the framework comprising a physical user interface for operating the tool.

In another aspect of the invention a method for cleaning contact surfaces of fiber optics ferrules engaged in a first connector half, comprising the steps of (a) fashioning a second connector half having one or more cleaning inserts, the cleaning inserts comprising adherent surfaces for removing particulates from engaged surfaces; (b) engaging the first and the second connector halves such that the adherent surfaces of the cleaning inserts contact the contact surfaces of the fiber optic ferrules; and (c) disengaging the first and second connector halves, removing any particles from the contact surfaces of the fiber optics ferrules.

In some cases the cleaning insert comprises a base structure having one or more extending fingers for extending through the first connector half, and in some cases the extending fingers may be removable. Further, in some cases the tool is in the form of a single connector half, having a sufficient number of cleaning inserts to match the standard number of fiber optics ferrules in a connector. Further still, in some cases the cleaning inserts are fashioned to be removable from the first connector half and discarded after one or a few cleanings. The adherent surface comprises a portion of double-back tape. One side may be more adherent than the other side, the less adherent side for collecting the particulate matter. In some cases there are at least four cleaning inserts.

In some embodiments the insert or inserts are used repeatedly for cleaning and the adherent portions are fashioned to be quickly removable to be discarded and replaced. In other cases the tool is fashioned as a dummy router card having a mounting surface mounting a plurality of the first connector halves, the dummy router card dedicated as a cleaning card. The dummy router card may be a fabric card and comprises at least 5 first connector halves, each retaining at least one cleaning insert, wherein the total of cleaning surfaces is no less than 20. Also, in some cases there may be a plurality of first connector halves implemented in a single contiguous framework, each of the first connector halves comprising a plurality of cleaning inserts, the framework comprising a physical user interface for operating the tool.

In embodiments of the invention described above in enabling detail, for the first time a cleaning tool is provided that is easy to use, reliable, and which aligns easily with fiber optic surfaces.

BRIEF DESCRIPTION OF THE DRAWING FIGURES

DESCRIPTION OF THE PREFERRED EMBODIMENTS

Figure 1:
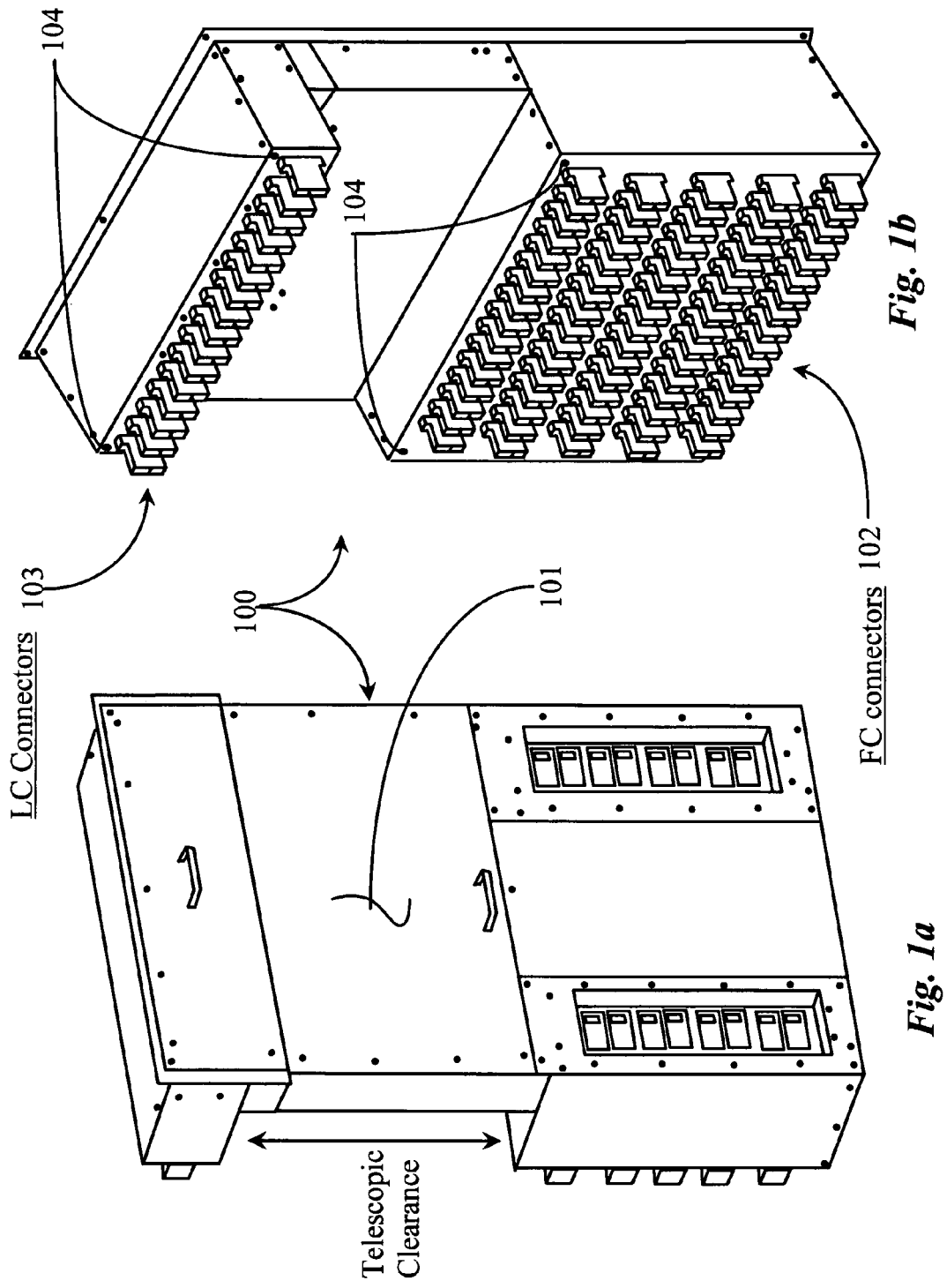
FIG. 1a is a perspective view of a backplane assembly according to an embodiment of the present invention as seen from a first vantage point.
FIG. 1b is a perspective view of a backplane assembly according to an embodiment of the present invention as seen from a second vantage point.

FIGS. 1a and 1b are perspective views of a backplane assembly 100 according to an embodiment of the present invention as seen from two separate vantage points. Backplane assembly 100 comprises separate top and bottom components or portions represented herein as components 105 and 106 that can be assembled together and whose clearance tolerance from each other can be adjusted via a telescopic or slidable method. Telescopic clearance is illustrated in this example by a bi-directional arrow labeled Telescopic Clearance. Both components 105 and 106 making up backplane 100 are, together, mounted to a back panel illustrated herein as back panel 101. Back panel 101 has plurality of openings provided therein and adapted for accepting fasteners as may be found in current art to secure the connection of backplane assembly or backplane 100 to a router chassis.

Referring now to FIG. 1b, backplane 100 has a plurality of openings provided therein and adapted to house a plurality of fabric card (FC) connectors 102. These connectors comprise a communication signal interface to a set of fabric cards. Connectors 102 are contained in portion 106 of backplane assembly 100. Connectors 102 are, in this particular embodiment plastic plug-in connectors arranged in a Cartesian array, which is designed to match the positions of fabric card terminals of fabric cards housed in a card cage in a data router chassis (not illustrated). Backplane 100 also has a plurality of line card (LC) fiber-optics connectors 103 provided therein, that comprise another signal interface, this time to line cards. Connectors 103 are arranged in the top portion of backplane assembly 100. Like fabric-card connectors 102, they are plastic plug-in connectors. Connectors 103 are arranged in a row matching the pattern of connectors on line cards installed in a main router chassis.

The structure for backplane assembly 100 (portions 105 and 106) may be manufactured from aluminum, sheet metal, or other durable material that may be formed and machined. Similarly, panel 101 may be manufactured from aluminum or other sheet metals.

In this example, backplane connections are implemented using fiber optics ferrules well-known in the art. In other embodiments of the invention the connectors on the signal interfaces can be for electrical signals. Connector housings 102 and 103 function to mechanically house either the female or alternatively, the male ferrule. Each ferrule presents optic strands or fibers, which are strategically aligned by the connection method so that data may be transmitted between the strands. In actual practice in a preferred embodiment, each connector housing (102, 103) contains 4 optics ferrules either male or female. Card terminals (not shown) within a router chassis contain 4 ferrules, which mate with the ferrules in connector housings 102 and 103. If the ferrules on the router card terminals are male, then the ferrules on the connector housings will be female.

Intercommunication between router cards then is facilitated by connectors 102 and 103 comprising an "optics backplane". Unlike a physical electrical backplane board of prior art, fiber strands comprising communication paths interconnect specific ferrules contained in the housings enabling cross communication among cards housed in the main router chassis. Similarly, ferrules provided in separate router chassis may be connected by fiber-optics, enabling a fabric card housed in one router chassis to communicate with a similar card housed in a separate router chassis essentially providing a scalable router. The implementation of fiber-optic communication as a backplane enables multiple router chassis integrated by backplane communication to form one router to be located much further apart than is practical with prior-art electrical back-planing methods.

In the example of FIG. 1, backplane assembly 100 has 4 alignment openings 104 provided therein and adapted to accept alignment pins or dowels (not shown) provided in a main router chassis. Alignment openings 104 are strategically located in four strategic locations on the backplane assembly 100, two on the top portion and two on the bottom portion. Openings 104 are somewhat larger in diameter than the corresponding diameter of alignment pins or dowels on a router chassis. The oversizing enables acceptance of the alignment pins of a router chassis without causing misalignment of connectors.

As was described above, backplane assembly 100 in this example consists of two portions 105 and 106 that are assembled together in a slidable fashion, providing an adjustment mechanism, enabling both vertical and some horizontal float. When back panel 101 is completely installed to backplane assembly 100, the slidable position with respect to portions 105 and 106 of the assembly is locked. The goal of telescopic capability as an adjustment mechanism is to enable alignment openings 104 to be conditionally tolerenced to fit over fixed alignment pins housed in any main router chassis. It is noted herein that the alignment pins in a router chassis are associated carefully to the true position of fabric and line card connectors presented for engaging connectors 102 and 103 respectively, such that when backplane 100 is adjusted for fit over the alignment pins, all of the optics connections are aligned for plug-in. The dimensional variance may change somewhat from chassis to chassis. Therefore, provision of an adjustable backplane assembly provides modularity.

Figure 2:
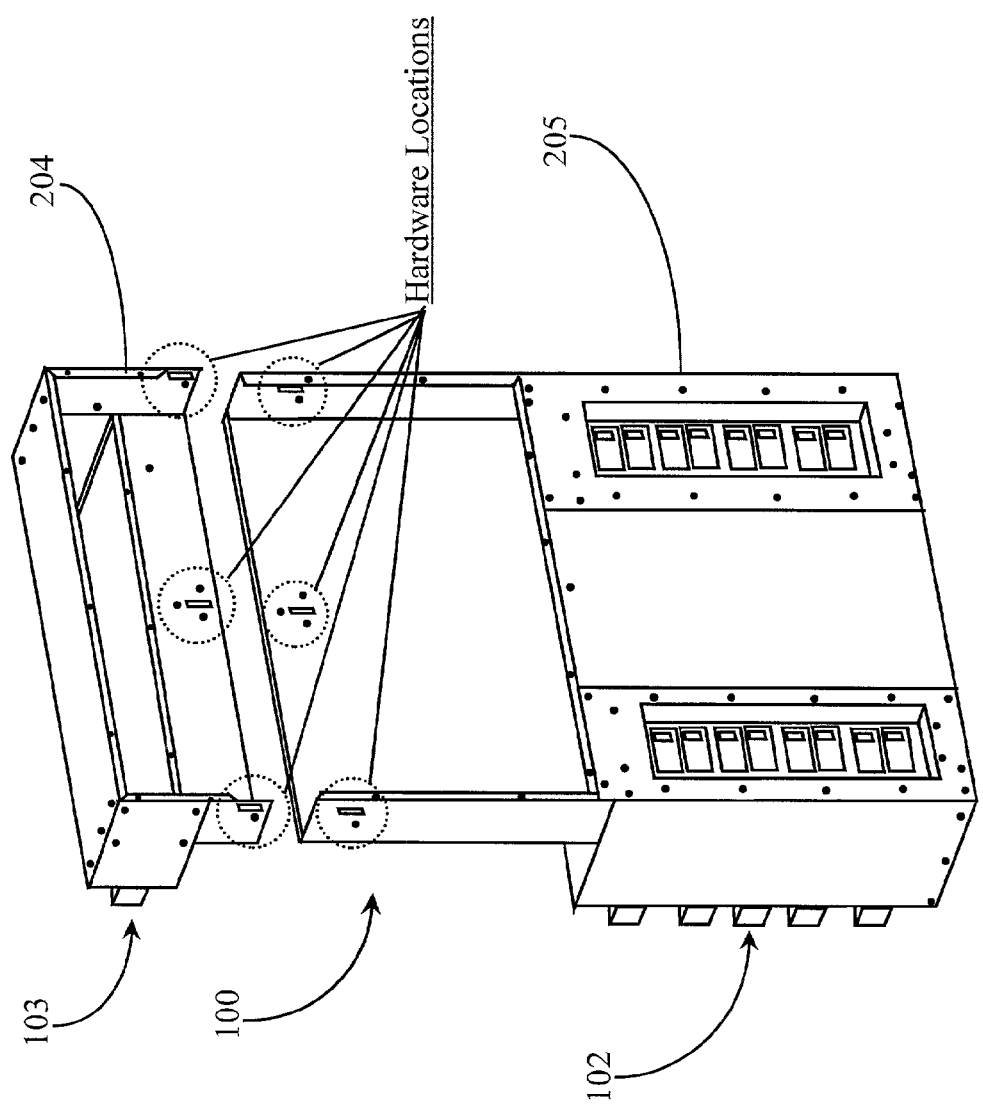
FIG. 2 is a perspective view of the backplane assembly of FIG. 1 shown disassembled.

FIG. 2 is a perspective view of the backplane assembly 100 of FIGS. 1a and b shown disassembled illustrating separate components 105 and 106.

This disassembled view illustrates the mechanism of the telescopic capability of backplane assembly 100. Component or upper portion 105 houses connectors 103 while component or lower portion 106 houses connectors 102. Backplane assembly 100 is illustrated in this example without back panel 101 of FIG. 1 in order to reveal alignment slots that enable telescopic adjustment. For example, lower portion 106 has 3 alignment slots provided therein and labeled "hardware locations". These alignment slots correspond to a matching array (3) of alignment slots provided in upper portion 105. Each alignment slot is elongated to provide the vertical float adjustment described with reference to FIG. 1 above. Upper portion 105 may be manufactured of such a width dimension so as to fit inside portion 106 or so as to fit over portion 106. The alignment slots are adapted to fit around a common fastening hardware such as bolts.

In one embodiment, metal inserts (not shown) may be used to provide an adjustment mechanism at the location of each alignment slot. Such inserts are loosened to allow float capability along the elongated slots until suitable match up of alignment openings 104 (FIG. 1) with matching alignment pins on a router chassis is achieved. With alignment accomplished, meaning that openings 104 are successfully mated with corresponding alignment pins provided in a main router chassis, the telescopic fasteners can be tightened securing the aligned positioning and backpanel 101 (FIG. 1) may then be installed.

Figure 3:
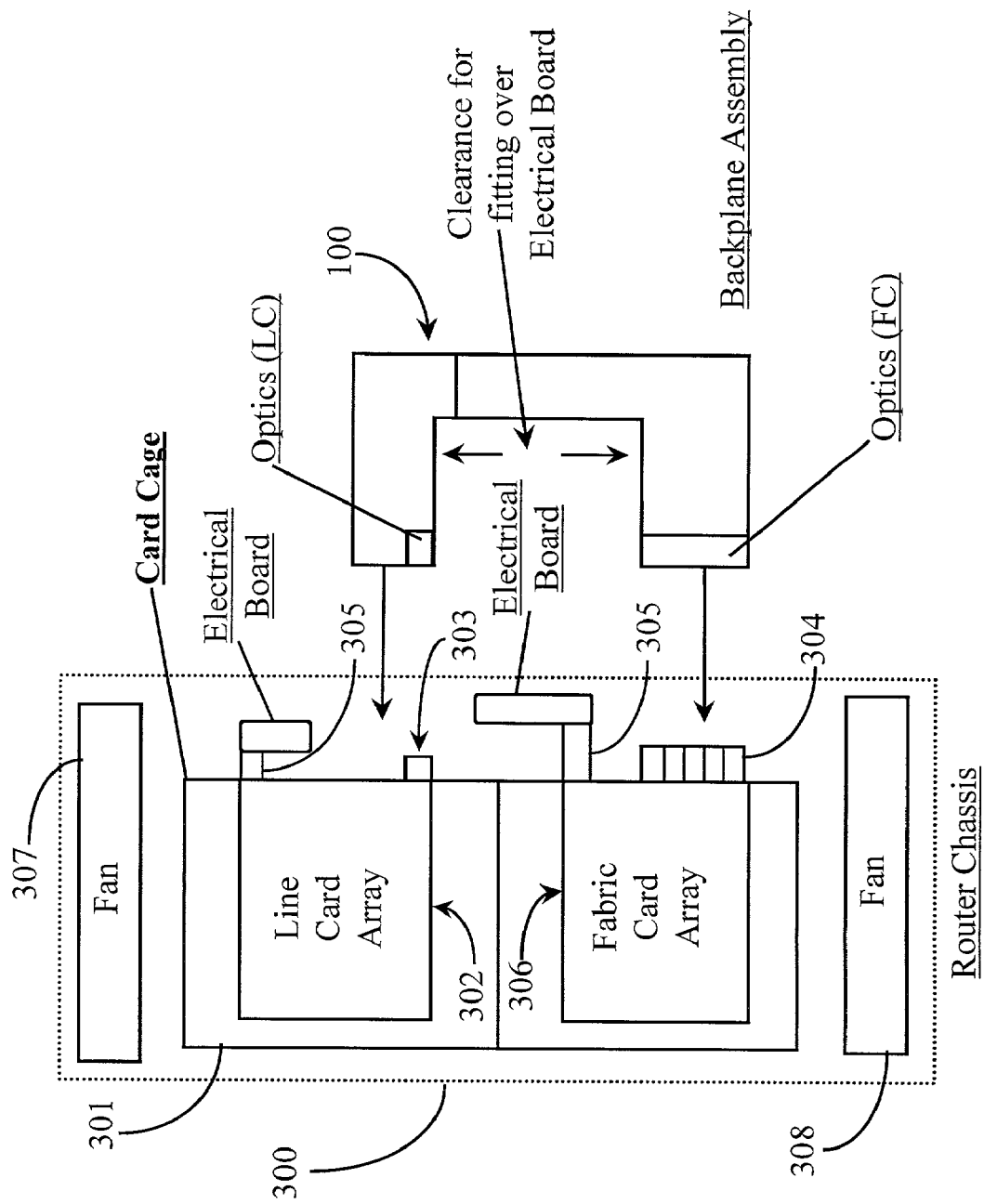
FIG. 3 is a block diagram illustrating the relationship between the backplane assembly of FIGS. 1 and 2 to a main router chassis according to an embodiment of the present invention.

FIG. 3 is a block diagram illustrating the relationship of backplane assembly 100 to a main router chassis 300 according to an embodiment of the present invention. Again, the adjustable backplane assembly in various embodiments may be for connection of elements in many sorts of cabinets and systems, of which packet routers are a single example.

Main router chassis 300 houses a card cage 301. Card cage 301 is adapted to support a line card array 302 and a fabric card array 306. It is noted herein that line cards 302 and fabric cards 306 of router chassis 300 are supported within cage 301 in a fashion similar to books being stacked along side each other at equal spacing from each other. Each card rests in a card slot (not illustrated). The card slots are provided equally spaced from one another, the cards adapted individually to fit snugly into a designated slot. It is also noted herein that a comparatively few control cards (not illustrated) are, in actual practice, included in line card array 302.

Exposed Fiber-optics connectors, illustrated herein as fiber-optics connectors 303 (for line cards) and fiber-optics connectors 304 (for fabric cards) are in true-position relationship with respect to one another when the cards are installed in their respective slots. Fiber-optics connectors 304 and 303 fit easily through provided openings machined into or provided in a separate piece like a grate that is mounted onto main router chassis 300. It is noted herein that the pattern of openings provided for fitting card terminals there through has all individual openings oversized with respect to inner dimensioning to accept the plastic connector housings in a slip-through fashion. However, the pattern of openings provided on backplane 100 comprise individual openings that are tightly-toleranced. Each line card and fabric card has, in addition to fiber-optics connectors 304 and 303, connectors 305 to facilitate plug-in connection to conventional electrical backplane boards, labeled as such, which are installed in main chassis 300. It is noted herein that electrical backplanes are still used in this example for propagating error messaging and other such signals.

In various applications the backplane assembly may be implemented as an electrical backplane or as a fiber-optic backplane. However, fiber-optics is used in this example to transmit information related to data packets from card to card along with certain other message types. Fiber-optics FC and LC connectors provided on housing 100 are analogous to connectors 102 and 103 respectively of FIG. 1. In this example one or more fiber-optics cables, represented by element number 310, connect the upper and lower signal interfaces (the fiber-optic connectors 102 and 103, see FIG. 1a and b). This cable or cables are provided with sufficient slack that the necessary adjustment can be made between the upper and lower portions of the backplane assembly. In the case of an electrical backplane this cable or cables comprise cables of electrical conductors.

In one embodiment, especially useful in an electrical backplane, separate PCBs may be mounted at the upper and lower signal interfaces, and cable connection 310 is accomplished between these PCBs. In this embodiment the connection PCBs may be considered a part of signal interfaces 102 and 103.

When backplane assembly 100 is in a loosened and vertically-adjustable mode, alignment openings 104 (FIG. 1) are placed over the alignment pins (not illustrated) of chassis 300. At this point line card connectors 103 (Optics (LC)) and fabric card connectors 102 (Optics (FC)) are in proper alignment to be presented to line card connectors 303 and fabric card connectors 304 respectively. Housing 100 fits to chassis 300 generally in the direction of the illustrated directional arrows.

Backplane assembly 100 has a built-in vertical clearance area designed to allow enough room for the router's lower electrical board 305 when the optics backplane assembly 100 is installed to chassis 300. This area is illustrated herein by the arrows labeled Clearance for fitting over Electrical Board. Also shown are cooling fans housed in the top and bottom sections of the main router chassis 300. Cooling fans are for dispersing heat generated by processing.

Removal of a Backplane Assembly:

Referring now to FIG. 3, it is again noted herein that each fabric card (306) and line card (302) fits into card cage 301 as previously described with respect to the main router housing (300) so that the method of unplugging and disconnecting a card from a mounted backplane assembly is to simply pull the card out from its slot similar to removing a modular PC card from a PC slot. To remove the entire backplane assembly itself from the router chassis, all of the line cards and fabric cards are physically pulled from their connections to the optics backplane assembly and can remain aligned in their slots. Backpanel 101 (FIG. 1) is first removed exposing the aligned interface portion ("Hardware Locations", (FIG. 2) of backplane assembly 100. The fasteners connecting and tightening the alignment interfaces are removed and backplane assembly 100 may be removed from chassis 300.

In one embodiment the back panel does not have to be removed from the backplane module. In this embodiment strategic openings (not illustrated) are placed through the wall of the back panel that allow access to the tightening bolts around the alignment pins such that they may be removed with, perhaps, a specially designed tool. In still another embodiment, a portion of back panel 101 may be hinged such that the portion swings open exposing alignment interfaces.

Installing a Backplane Assembly:

Installation of a backplane assembly is essentially reversed from removal. Referring back to FIG. 2 the telescopic fasteners of the two-piece assembly are loosened to provide float capability for aligning the alignment pins to the alignment openings 104 of FIG. 1. Openings 104 are only slightly oversize from the alignment pins and not enough to cause miss-alignment of connectors as previously described. Once the alignment pins are engaged through openings 104 of assembly 100, then the alignment interfaces are tightened and back panel 101 may be reinstalled. At this point the line and fabric cards may be slid back into their slots and plugged in using suitable force.

In one embodiment backpanel 101 is first removed exposing the alignment interface portion of the backplane module. The connecting and alignment fasteners are then loosed and removed allowing the backplane module to be removed from the main router chassis.

It will be apparent to the skilled artisan that there are a variety of alterations that may be made to the embodiments described herein without departing from the spirit and scope of the invention. For example, in one embodiment, instead of optics ferrules, other known fiber-optics connection mechanisms may be utilized to effect backplane connections.

Providing an optics backplane that is modular and adjustable enables flexibility in maintenance in addition to improved signal transmission. For example, if an optics backplane assembly requires service or testing, a spare backplane module may be fitted to the host chassis so that it is not out-of-service while it's backplane assembly is being serviced. The fiber connections may be simply removed and re-routed as well enabling quick re-assignment of communication paths for card-to-card communication.

The present invention may be adapted to routers of same or different manufacture. There are many possible embodiments for providing specific and optimal backplane schemes.

Contact Surface Cleaning

In a preferred embodiment of the present invention a cleaning method and apparatus is provided for cleaning particulate matter from fiber-optics contact surfaces on ferrules installed in the backplane assembly. The method and apparatus is described in enabling detail below.

Figure 4:
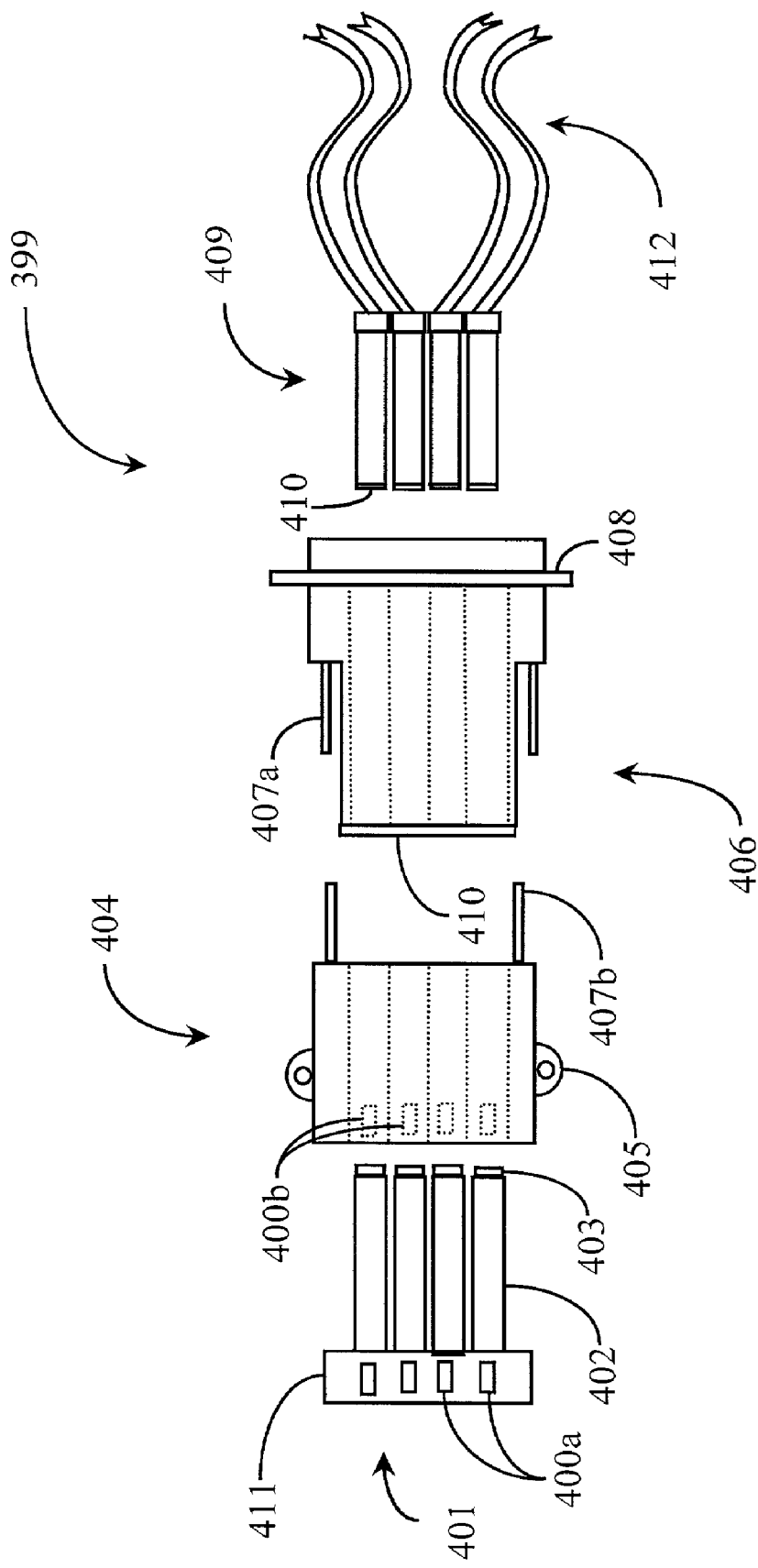
FIG. 4 is an assembly view of a fiber-optics connector housing and contact apparatus according to an embodiment of the present invention.

FIG. 4 is a plan view of a disassembled fiber-optics connector housing and ferrules 399 with a unique contact cleaning apparatus insert 401 shown according to an embodiment of the present invention. Housing apparatus 399 comprises a first connector half 404, a second connector half 406, an array of ferrules 409 and a novel cleaning insert 401. Connector housing portions of halves 404 and 406 are designed and adapted to snap together using snap arms illustrated herein as snap arms 407a on connector half 406 and snap arms 407b on connector half 404. Snap arms 407a and b are adapted and designed to engage each other in a way not illustrated herein to cause moderate retention when the connector portions are snapped together such that sufficient force must be exerted to break the snap connection. The exact mechanism for snapping connector halves 404 and 406 together is not relevant to enablement of the present invention except to say that there are multiple possible snap-together arrangements. Snap arms 407a and b represent just one possible fastening method.

Connector portions 404 and 406 as well as snap arms 407a and b are typically manufactured from a durable and flexible polymer material. The standard versions of connectors 404 and 406 are available to the inventor and are not considered particularly novel in use except that using portion 404 in conjunction with novel insert 401 creates a unique embodiment enabling a cleaning apparatus comprising connector portion 404 and insert 401.

Connector portion 404 is presented in a vertical array on a router card such as one of the array of fabric cards (FC) 306 as illustrated with respect to FIG. 3 above (elements 304 representing connector portion 404). Screw retainer portions 405 are provided to accept screws used to fasten connector portion 404 to a router card. Connector portion 406 is presented in the backplane assembly portion of the router chassis. Portion 406 is analogous to FC connector 102 described with reference to FIG. 1 above and Optics (FC) illustrated on the Backplane assembly of FIG. 3. A flange 408 is provided on connector portion 406 to facilitate mounting to the backplane assembly, typically in Cartesian array as described with reference to FIG. 1. Screw openings in flange 408 are not illustrated in this example but may be assumed to be present as required. In another embodiment, connector portion 406 may simply be pressed into the backplane assembly.

Ferrule array 409 comprises 4 individual ferrules or inserts that are inserted into provided openings within connector portion 406 illustrated herein as dotted lines defining each opening. Ferrules 409 each have a snap head affixed thereto on the opposite side of a respective contact surface. The snap head, illustrated herein as a block at the rear of each ferrule, facilitates inserting and snapping each ferrule into place within connector portion 406. The ferrules 409 support a fiber optics wire set 412, the contact ends of which are not illustrated but may be assumed to be presented through a respective ferrule to a contact surface illustrated herein as contact surface 410 (one per ferrule).

A typical connection will include individual ferrules that insert into connector portion 404, however, in this example individual ferrules that would normally be inserted into portion 404 are not shown, in favor of cleaning insert 401. Insert 401 is adapted, in this example, as a one-piece insert in a comb-like structure. Individual insert fingers 402 protrude from a common base structure 411. A small piece of special cleaning tape 403 is presented at the end of each finger 402. The tape, which in a preferred embodiment is a double-back variety, has two separate sticky strengths. The side of tape 403 that makes contact with the end of a finger 402 is considerably stronger than the side that is used to clean particulate matter from a contact surface. In this way, the likelihood that a piece of tape will be left on a contact surface after cleaning is greatly reduced if not non-existent.

Cleaning insert 401, described above as a contiguous, comb-like structure, may also have removable, replaceable fingers extending from the base structure, and the number of fingers per base may vary. Further, there are a variety of ways an adhesive surface may be applied to the ends of the finger extensions. Sticky tape is but one example.

Base structure 411 has, in this example, 4 snap arms 400a that are provided to enable retention of insert 401 into connector portion 404. Snap arms 400a are adapted to seat into a like array of recesses 400b (dotted rectangles) provided strategically within portion 404. Tape portions 403 are adapted to remove particulate matter from ferrule contact surfaces 410. With insert 401 snapped into position within connector portion 404, and ferrules 409 snapped into position within connector portion 406, one simply snaps the 2 connector portions (404, 406) together momentarily to effect particulate cleaning. When the two portions are disengaged, the cleaning of surfaces 410 is complete.

Figure 5:
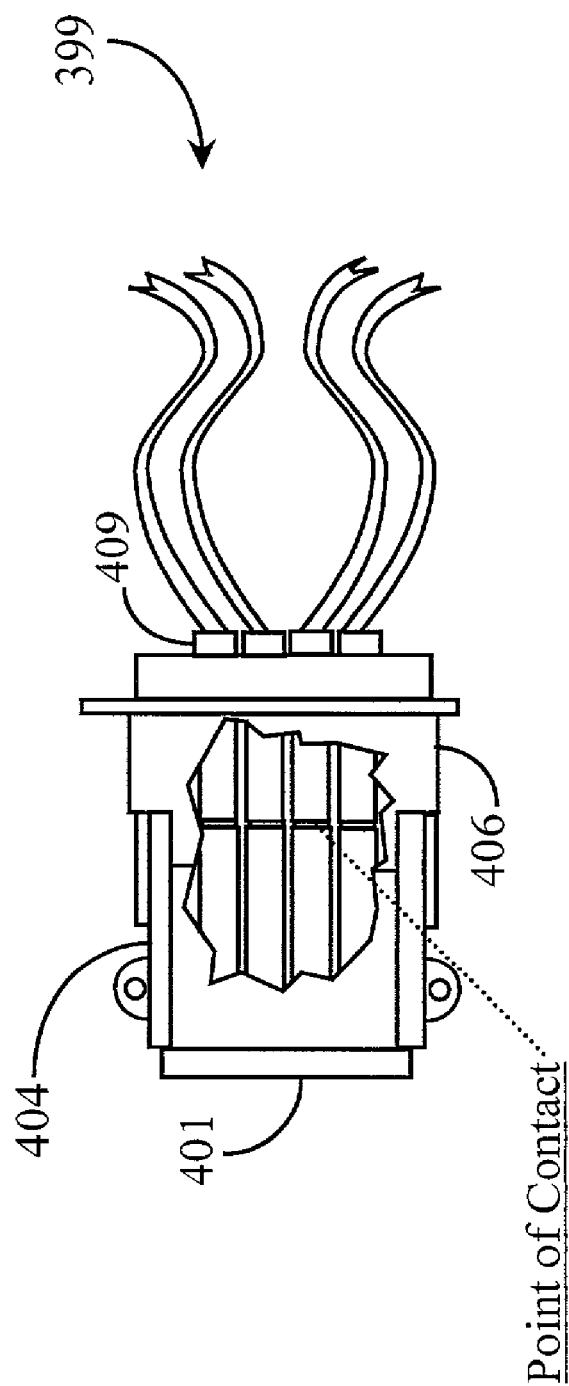
FIG. 5 is the assembly of FIG. 4 in a closed and connected position.

FIG. 5 shows the assembly 399 of FIG. 4 in a closed and connected position for cleaning. Connector assembly 399 is illustrated in a closed and snapped position in this example. Cleaning insert 401 is fully inserted into connector portion- or half 404 and inserts 409 are fully inserted into connector portion or half 406. The connector portions (halves) of connector 399 are snapped together to activate particulate cleaning. In this fully closed position, regions of contact are created between tape portions 403 and contact surfaces 410 as is illustrated in this example through a broken-away portion of the assembly. When the connector housing assembly is disengaged, the regions of contact are separated and cleaning is complete. That is to say that contact surfaces 410 are void of particulate matter that is now deposited on sticky tape portions 403. Insert 401 may, in one embodiment, be designed to be discarded after one or more cleaning actions. In another embodiment, insert 401 is retained but new sticky portions 403 are substituted for used ones. Insert 401 is modular in the sense that it can be used in any standard connector portion 404 turning that connector portion into a cleaner device.

In one embodiment of the invention, connector half 404 adapted with insert 401 is mounted to a handle and used as a single connector cleaner device. In this embodiment, a user may remove a card from a router card cage and insert the device through the open space left as a result of removing the card. The user may align and plug in connector half 404 with insert 401 into any open connector half 406 located on the backplane assembly presumably where the card was installed before removal for cleaning. In the case of a fabric card, there would be approximately 5 connector portions or halves 406 left open for cleaning after removing the card from its portion in the card cage. Connector halves 406 would typically be stacked in a vertical array. More than one insert will likely be required in order to engage all 5 halves 406, the total number of which includes at least 20 ferrule contact surfaces 410 for cleaning.

In still another embodiment, instead of one insert 401 having 4 fingers as was previously described as a preferred example, cleaning inserts may be provided separately as discard able inserts. One such discard able insert is illustrated in the example of FIG. 6 below.

Figure 6:
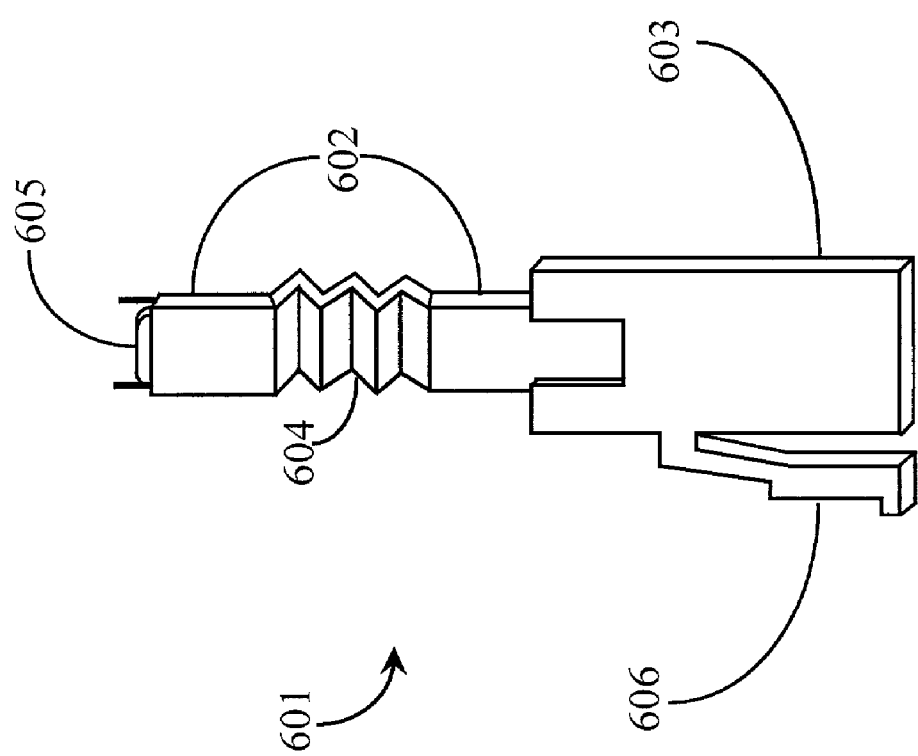
FIG. 6 is a perspective view of a single fiber-optics insert according to one embodiment of the present invention.

FIG. 6 is a perspective view of a single fiber-optics cleaning insert 601 according to an alternate embodiment of the present invention. In this alternate embodiment of the present invention cleaning insert 601 is provided as a single insert, which can be discarded immediately after use. In this embodiment, insert 601 is manufactured of an inexpensive polymer or other inexpensive and flexible material.

Cleaning insert 601 has a snap head 603 adapted to enable the insert to be retained in a connector-housing portion such as connector portion 404 of FIGS. 4 and 5. Snap head 603 has a snap arm 606 formed as a contiguous part thereof, which provides the snap-in capability to the host connector portion. In one embodiment, insert 601 and snap head 603 are molded as a contiguous piece using a flexible and durable polymer. Insert 601 has a flexible spring-body portion 604 provided therein and strategically located between a main insert body portion 602. Spring-body portion 604 is adapted to provide a certain flexibility and spring action to help align insert 601 in a host cavity in a connector housing and so that there is not too much pressure exerted against the contact surface of an opposing ferrule during the cleaning operation.

Spring-body portion 604 is, in this embodiment, formed in an accordion style fashion and may or may not have a hollow center. However, this form should not be construed as a limitation to the scope of the present invention, as other flexible forms may be envisioned and provided in a mold design. Tape portion 403, described in FIG. 4, is in position on the top or contact portion of main insert body 602.

In this example, 2 alignment pins are provided for the purpose of aiding alignment of insert 601 to an opposing optics insert. Openings (not shown) provided in the contact surface of an optics insert to be cleaned may act as recesses for the alignment pins. It should be noted herein that alignment pins are not necessarily required in order to successfully practice the present invention. In the optics connection scenario where 2 optics ferrules are mated, the alignment pins are present and aid the mating of the surfaces. In particulate cleaning they are not strictly required, but simply illustrated herein as an option. This example describes a single discardable cleaning insert that can be used once or a few times, and then thrown away. Such insert can be manufactured en mass and packaged economically. It should be noted herein that the cleaning insert 401 described with reference to FIG. 4 and FIG. 5 remains the preferred example or best-use design. In the case of insert 401, detailed attributes of insert 601 may be present therein such as a spring-body portion 604 and the illustrated alignment pins for each finger of insert 401.

As was described further above, it is desired to be able to clean as many contact surfaces as possible in one operation. Therefore, insert 401 represents a best-use example of insert architecture that will be explained further below with respect to the example of FIG. 7.

Figure 7:
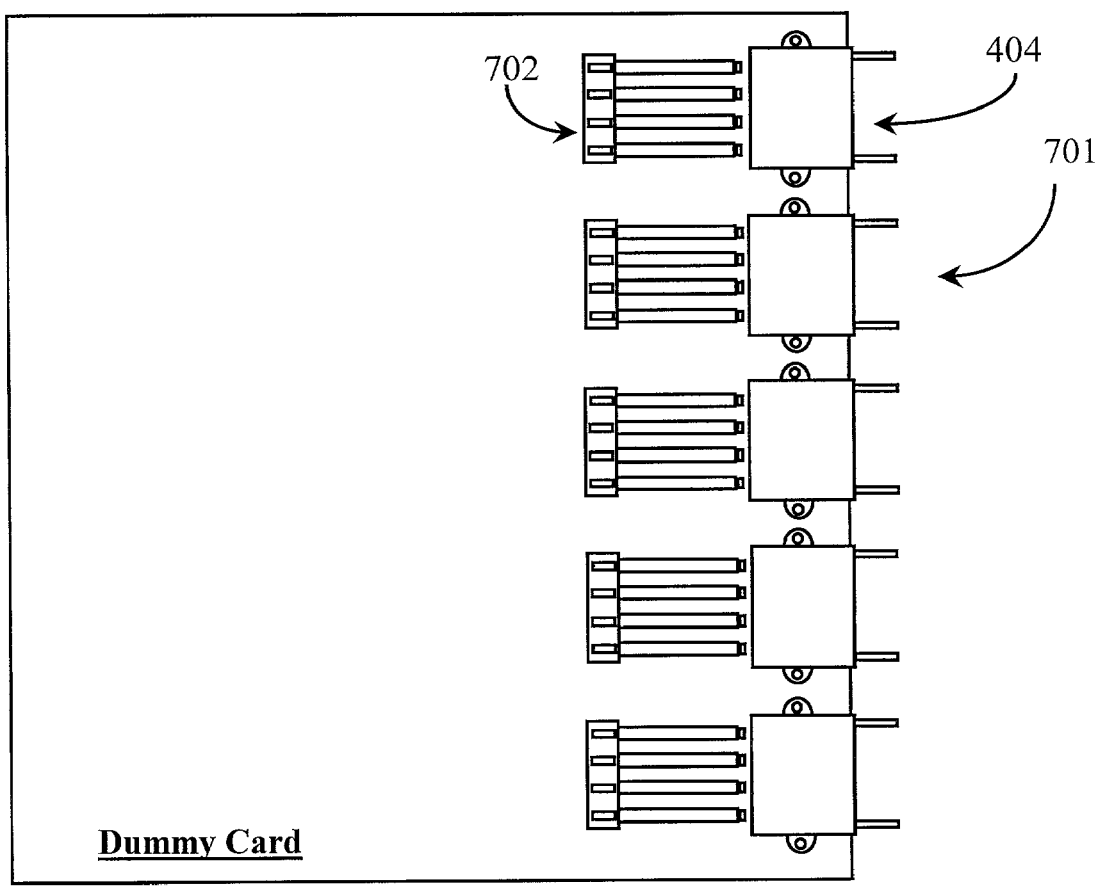
FIG. 7 is a plan view of a dummy fabric card and inserts for cleaning according to an embodiment of the present invention.

FIG. 7 is a plan view of a dummy fabric card 701 and inserts 401 for cleaning according to an embodiment of the present invention. As was previously described above with reference to FIG. 3, router cards plug into the backplane assembly. Specifically, a fabric card in an application known to the inventor typically has at least 5 connector housing portions mounted thereon and stacked more or less in a vertical array.

In a preferred embodiment, card 701 is used as a cleaning card. Card 701 has an array of connectors 404 that fit the opposing array of connectors on the backplane. Therefore when a real card is removed from its position, the dummy card 701 can be inserted in its place. Plugging in card 701 into the backplane assembly functions to clean all of the contact surfaces simultaneously.

Using the insert 401 of FIGS. 4 and 5, and connector portions 404 to house the cleaning inserts 401, a dummy card 701 is realized that can be used as a single cleaning apparatus, with which all of the contact surfaces exposed by removing the real fabric card can be cleaned simultaneously. In actual practice, a second dummy card could be provided for the line card shelf. There are many possibilities.

Inserts 401 are, in a preferred embodiment, throw-away inserts, meaning that they are discarded after one or a few uses. In another embodiment, inserts 401 are permanent fixtures in the sense that they are not immediately discarded and only the tape portions 403 are replaced after one or a few cleanings.

Figure 8:
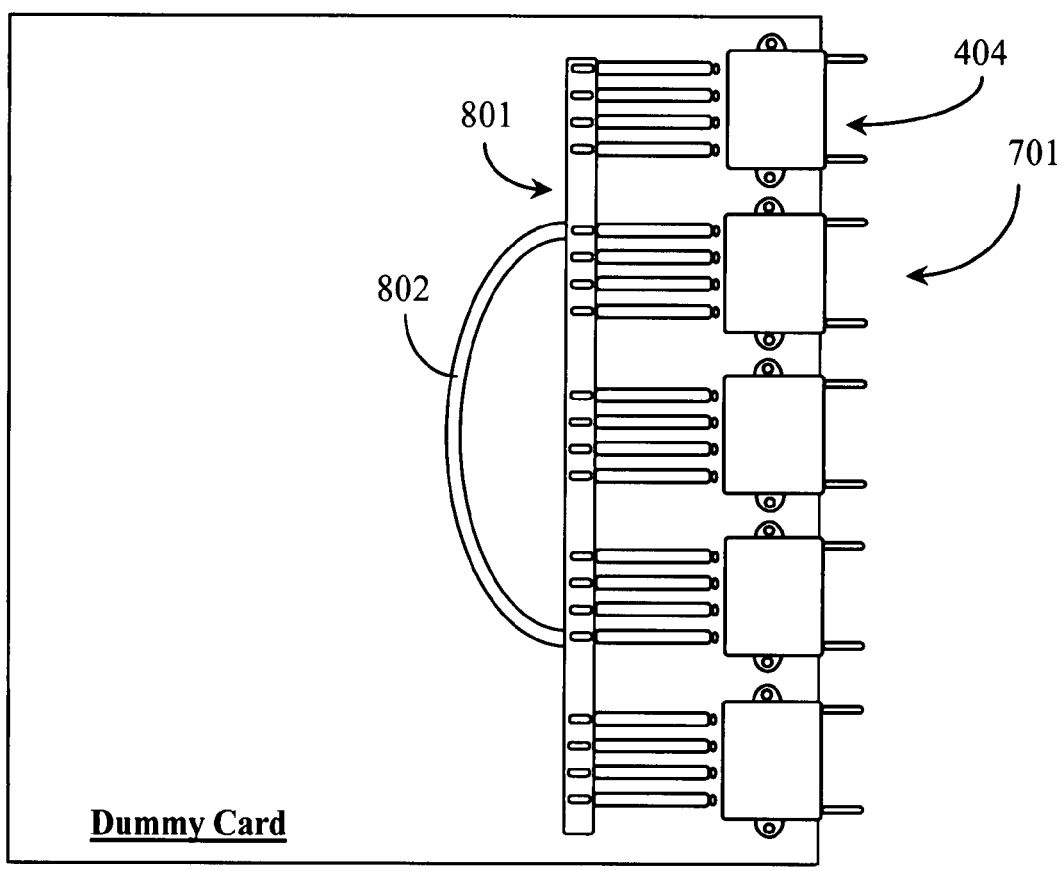
FIG. 8 is a plan view of a dummy fabric card having a contiguous cleaning insert bar according to an embodiment of the present invention.

In still another embodiment, as shown in FIG. 8, an insert bar 801 may be provided in a single contiguous piece that contains all of the inserts and presents them collectively as one solid insert. In these embodiments there may also be a physical user interface (a handle) 802, to facilitate use of the tool. It will be apparent to one with skill in the art that there are many ways to provide inserts, individually, as sets, or as one entity. Structures may be provided presenting cleaning inserts in a wide array of combinations and patterns. By using card 701 as a cleaning card, no aligning or adjustment is required and all of the contact surfaces involved in the domain of one router card can be cleaned simultaneously.

The method and apparatus of the present invention should be afforded the broadest scope under examination in view of the many possible embodiments. The spirit and scope of the present invention is limited only by the claims that follow.

What is claimed is:

1. A dummy router card dedicated as a cleaning card for cleaning particulate matter from contact surfaces of a plurality of fiber-optics ferrules of an electronics assembly, comprising:

a mounting surface mounting a plurality of connector housings, each housing having a first connector half adapted to engage a matching second connector half, the second connector half hosting the plurality of ferrules of the electronics assembly to be cleaned;

a replaceable contiguous cleaning insert bar comprising a base structure having a plurality of fingers extending through the first connector halves, sized and arranged to contact corresponding contact surfaces of the plurality of fiber-optics ferrules of the second connector halves, with the first connector halves engaged in the second connector halves, and a portion of double-back tape adhered to the cleaning end of each extending finger for simultaneously removing particulates from a plurality of engaged surfaces, wherein one side of the tape is more adherent than the other side, the less adherent side for collecting the particulate matter.

2. The dummy router card of claim 1 wherein the plurality of cleaning inserts of the cleaning bar are implemented in a single contiguous framework and the cleaning card comprises a physical user interface for operating the tool.

3. The dummy router card of claim 2 wherein the number of cleaning inserts of the cleaning bar match the standard number of fiber-optics ferrules in the second connector halves of the electronics assembly to be cleaned.

4. The cleaning dummy router card of claim 1 wherein the dummy router card is a fabric card and comprises at least 5 first connector halves, each adapted to engage a matching number of cleaning inserts of the cleaning bar, and wherein the total of cleaning surfaces of the extending fingers is no less than 20.

* * * * *